US007730450B2

(12) United States Patent
Mercer

(10) Patent No.: US 7,730,450 B2
(45) Date of Patent: Jun. 1, 2010

(54) AUTOMATIC VERSIONING AND DATA MUTATION OF USER-DEFINED DATA TYPES

(75) Inventor: Stephen R. Mercer, Austin, TX (US)

(73) Assignee: National Instruments Corporation, Austin, TX (US)

(*) Notice: Subject to any disclaimer, the term of this patent is extended or adjusted under 35 U.S.C. 154(b) by 1512 days.

(21) Appl. No.: 11/047,198

(22) Filed: Jan. 31, 2005

(65) Prior Publication Data

US 2006/0036656 A1 Feb. 16, 2006

Related U.S. Application Data

(60) Provisional application No. 60/601,066, filed on Aug. 12, 2004.

(51) Int. Cl.
*G06F 9/44* (2006.01)
(52) U.S. Cl. .................. 717/120; 717/113; 717/116; 717/105; 707/683; 707/684; 707/702; 707/695
(58) Field of Classification Search .................. 717/122
See application file for complete search history.

(56) References Cited

U.S. PATENT DOCUMENTS

| 5,732,277 | A | | 3/1998 | Kodosky et al. |
| 6,119,130 | A | * | 9/2000 | Nguyen et al. ............... 707/203 |
| 6,389,425 | B1 | | 5/2002 | DeMichiel et al. |
| 6,857,118 | B2 | | 2/2005 | Karr et al. |
| 6,868,526 | B2 | | 3/2005 | Singh |
| 6,947,798 | B2 | * | 9/2005 | Bronikowski et al. ......... 700/90 |
| 6,963,880 | B1 | * | 11/2005 | Pingte et al. ............ 707/103 R |

OTHER PUBLICATIONS

Simon Monk and Ian Sommerville Schema Evolution in OODBs Using Class Versioning Sep. 1993 SIGMOD Record, vol. 22, No. 3, pp. 16-22.*
Coote et. al. Graphical and Iconic Programming Languages for Distributed Process Control : An Object Oriented approach 1988 In Proc . IEEE Workshop on Visual Language, 183-189.*

(Continued)

*Primary Examiner*—Lewis A Bullock, Jr.
*Assistant Examiner*—Paul Mills
(74) *Attorney, Agent, or Firm*—Meyertons Hood Kivlin Kowert & Goetzel, P.C.; Jeffrey C. Hood; Mark S. Williams

(57) ABSTRACT

System and method for automatic versioning and data mutation for user-defined data types. A program development environment may be operable to: create a first version of a data type definition in response to user input; instantiate and store an object of the first version of the data type, optionally including a version identifier indicating the version of the object; modify the first version of the data type definition in response to user input, thereby creating a second version of the data type definition; load the object from storage; and automatically (without user intervention) modify the object to conform to the second version of the data type definition. Successive modifications of the data type definition may generate successive versions of the data type. Objects instantiated and stored according to a previous version of the data type may be loaded from storage and automatically modified to conform to a specified subsequent version.

32 Claims, 10 Drawing Sheets

Computer System
82

OTHER PUBLICATIONS

Esmond Pitt et. al. java.rmi: The Remote Method Invocation Guide 2001 Pearson Education Limted Section 3.9 and 3.10.*

Simon Monk A graphical User Interface for Schema Evolution in an Object-Oriented Database Computing Department, Lancaster University 1994.*

Simon Monk A Model for Schema Evolution in Object-Oriented Database Systems Feb. 1993 Computing Department, Lancaster University.*

Terence Critchlow Schema Coercion: Using Database Meta-Information to Facilitatedata Transfer Department of Computer Science The University of Utah Jun. 1997.*

Fabrizio Ferrandina Thorsten Meyer, Roberto Zicari, Guy Ferran, Joelle Madec Schema and Database Evolution in the O2 Object Database System Proceedings of the 21th VLDB Conference, 1995.*

Erik Odberg A Global Perspective of Schema Modification Management for Object-Oriented Databases Department of Computer Science Norwegian Institute of Technology 1994.*

Misha Dmitriev The First Experience of Class Evolution Support in PJama Department of Computing Science University of Glasgow, Jul. 1998.*

David Garlan, Charles Krueger, Barbara Lerner TransformGen: Automating the Maintenance of Structure-Oriented Environments ACM Transactions on Progranmmng Languages and Systems, vol. 16, No. 3, May 1994, pp. 727-774.*

Barbara Lerner, Nico Habermann Beyond Schema Evolution to Database Reorganization ACM SIGPLAN Notices archive vol. 25 , Issue 10 (Oct. 1990) pp. 67-76 ISSN:0362-1340.*

Object-based visual programming languages Sergiu S. Simmel Addendum to the proceedings on Object-oriented programming systems, languages, and applications (Addendum) Phoenix, Arizona, United States p. 99 Year of Publication: 1991.*

Mattias Ericsson; "GOOP History by Mattias Ericsson"; Jul. 1, 2003; 2 pages; Retrieved from the Internet: www.openg.org/tiki/tiki-index.php?page=GOOP+History+by+Mattias+Ericsson.

Jorgen Jehander; "Graphical Object-Oriented Programming in LabVIEW"; Application Note 143; October 1999; 16 pages; National Instruments Corporation, Austin, TX.

Jim Kring; "OpenGOOP—a component framework"; June 3, 2003; 36 pages.

* cited by examiner

| Module Version | Private Data TDIter | Default Default Data (flattened) | Parent module name | Custom Flatten function? | LabVIEW Version | User comments |
|---|---|---|---|---|---|---|
| 0 | clust of two int32 | 4,5 | Flow Object | No | 8.0d1 | |
| 1 | clust of two int32 | 7,8 | Flow Object | No | 8.0d1 | |
| 2 | clust of two doubles | 2.4, 3.3 | Flow Object | No | 8.0d1 | |
| 3 | clust of two doubles | 2.4, 3.3 | Flow Object | No | 8.1b2 | |
| 4 | clust of two doubles | 2.4, 3.3 | PairOfAnything | No | 8.1b2 | |
| 5 | clust of two doubles | 2.4, 3.3 | PairOfAnything | No | 8.1b2 | |
| 6 | clust of two doubles | 2.4, 3.3 | PairOfAnything | Yes | 8.1b2 | |
| 7 | clust of two doubles | 2.4, 3.3 | PairOfAnything | Yes | 8.1b2 | Release to customers |

Figure 5

```
<Object>
<Name>Ben</Name>
<NumLevels>2</NumLevels>
<Versions>1,3</Versions>
<Cluster>          <<<< First level starts here
<Name>error in (no error)</Name>
<NumElts>3</NumElts>
<Boolean>
<Name>status</Name>
<Val>1</Val>
</Boolean>
<I32>
<Name>code</Name>
<Val>3</Val>
</I32>
<String>
<Name>source</Name>
<Val>The First Property Node</Val>
</String>
</Cluster>
<String>  <<<< Second level (custom XML) starts here
<Name>Custom</Name>
<Val>asdf asdr asdfw3 asdfawdf asdfa</Val>
</String>
</Object>
```

Figure 6

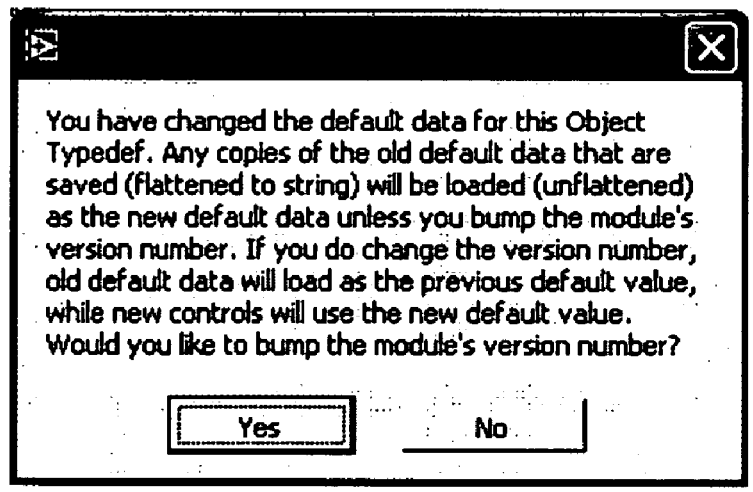
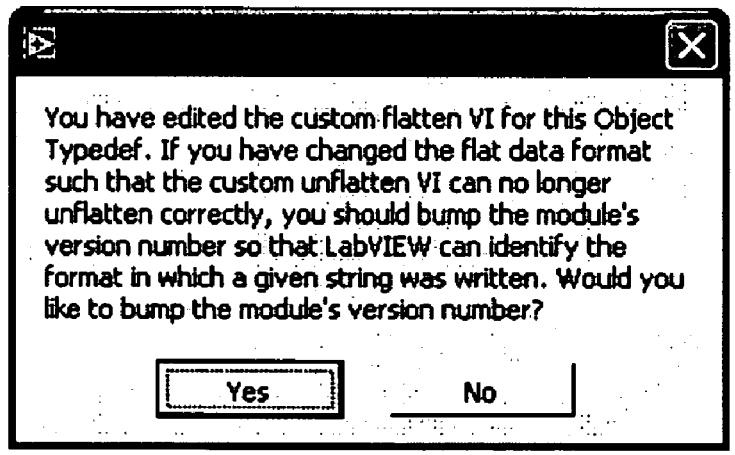
Figure 7

AUTOMATIC VERSIONING AND DATA MUTATION OF USER-DEFINED DATA TYPES

PRIORITY DATA

This application claims benefit of priority of U.S. Provisional Application Ser. No. 60/601,066 titled "Automatic Versioning and Data Mutation of User-Defined Data Types" filed Aug. 12, 2004, whose inventor was Stephen R. Mercer.

FIELD OF THE INVENTION

The present invention relates to the field of programming, and more particularly to a system and method for creating and using user-defined data types.

DESCRIPTION OF THE RELATED ART

Software programs and programming have become ubiquitous in the modern world, finding application in virtually all fields, including for example, industrial applications such as automated design, testing, and manufacturing, as well as financial, scientific, and entertainment applications, among others. Many different techniques and tools for programming have been developed, including for example, high level text-based programming languages such as BASIC, C, C++, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

These languages utilize the concept of a data type, in which the raw bits of memory, rather than being handled as a string of zeros and ones, are interpreted as more complex concepts. For example, an arbitrary set of 32 bits may represent any number of concepts, such as: an unsigned integer between 0 and $2^{32}-1$, a sequence of four smaller numbers and used as a network address, a pointer to an address in memory, and so forth. By requiring the programmer to declare the intended usage—i.e., the data type—for each piece of memory, the program may limit the actions taken with that piece of memory and thus reduce programming errors.

In the late 1970's and early 1980's, object oriented programming (OOP) was developed, based on the central idea of an object. Prior to development of OOP, the programmer was limited to data types that were built into the language, i.e., primitive and/or intrinsic data types, or defining groups of these built-in types. OOP suggested that the user should not only be able to define the structure of memory, but also define the operations that were legal on that memory. The term "class" came to represent a new kind of data type in which the data and the methods that operated on that data are packaged together. An object in memory is of a particular class type. In current OOP languages, object classes are generally defined by specifying one or more data fields, i.e., member variables, and/or associated functions, i.e., member functions or methods. As with the primitive data types, class types may be intrinsic to a language, though most are user-defined. Further, new class types may be defined by "inheriting" from existing classes, a term known in the art to mean acquiring all the data and methods from an existing class type and then adding new data and/or methods to the new type and/or providing alternate behavior for the existing methods, known as function overloading, where a child class defines a function with the same name as one of its parent class functions, and where the child function overrides the parent function.

Examples of OOP languages include Smalltalk, C++, JAVA, and ADA, among others.

Over the lifetime of use of a class, various modifications to the class may be made, thereby creating different versions of the class. For example, the member variables or fields may be changed or re-formatted, member functions changed or replaced, or inheritance relations changed. Objects may have been instantiated from these different versions of the class and may be stored in databases, saved on disk or in memory (on local or remote machines), and utilized in numerous programs. Thus the objects, all technically of the same data type, may have different formats and features in the various programs. Maintaining currency of all of these objects is difficult, tedious, and error prone.

The individual programmer, i.e., the author or "owner" of a class, is generally responsible for providing mutation support for the class, where the term "mutation" is used herein to refer to the process of converting an old format of a class to the new format of a class. The techniques for manually providing support for this conversion are well known, and generally require that the programmer 1) have a storage format that records the class ID and version, and 2) provide a function in the code that can read the old version of the data and write the new version.

This functionality is generally provided by the programmer for each class that the programmer believes may someday be modified, and should be provided at the time the first version is created. If a programmer does not include such support, it may be very difficult to recognize which version a given piece of data comes from and to decide which mutation operations are necessary.

The mutation functions themselves are typically non-trivial. A simple mechanical analysis of the old version's list of element data types and the new version's list may miss such subtleties as swapping the position of two elements whose type is identical or performing a data conversion on an individual element. The problem becomes substantially more complex when one considers inheritance: not only may the elements of the child class mutate, but the parent class on which the child is based may mutate, and so the parent mutation function must be written generically to operate on any children that the parent may have (and which the parent does not know about at the time the parent is edited).

Thus, improved systems and methods for automatic versioning and mutation of user-defined data types are desired.

SUMMARY OF THE INVENTION

One embodiment of the present invention comprises a system and method for automatic versioning and data mutation for user-defined data types.

Although some of the embodiments presented herein are described in terms of a graphical programming language, specifically, the "G" graphical program language of LabVIEW, provided by National Instruments Corporation, the various techniques disclosed may be used in and by development and execution environments of text based languages as well.

In some embodiments, the system and method may be considered as two parts or stages that operate in conjunction. For example, a first portion or part may comprise functionality in a language's development environment, e.g., an integrated development environment (IDE), for automatically generating mutation functions between versions of a user-defined class based on user input which specifies the new versions; and a second portion or part may include functionality in an execution system of a language for storing and loading user-defined class data such that the mutation functions needed for any piece of data may be recognized and applied automatically without user input. Note that this functional division into two parts or portions is exemplary only, and is not intended to limit the invention to any particular organization or form.

Some embodiments may be implemented in text-based code, e.g., C++ code, embedded in a graphical program development and execution environment, e.g., National Instruments's LabVIEW software.

BRIEF DESCRIPTION OF THE DRAWINGS

A better understanding of the present invention can be obtained when the following detailed description of the preferred embodiment is considered in conjunction with the following drawings, in which:

FIG. 5 illustrates an exemplary mutation record for a class, according to one embodiment;

FIG. 6 illustrates a sample of a flattened Object formatted in XML, according to one embodiment;

FIG. 7 illustrates exemplary dialogs for incrementing the version of a module, according to one embodiment.

Figure 1A:
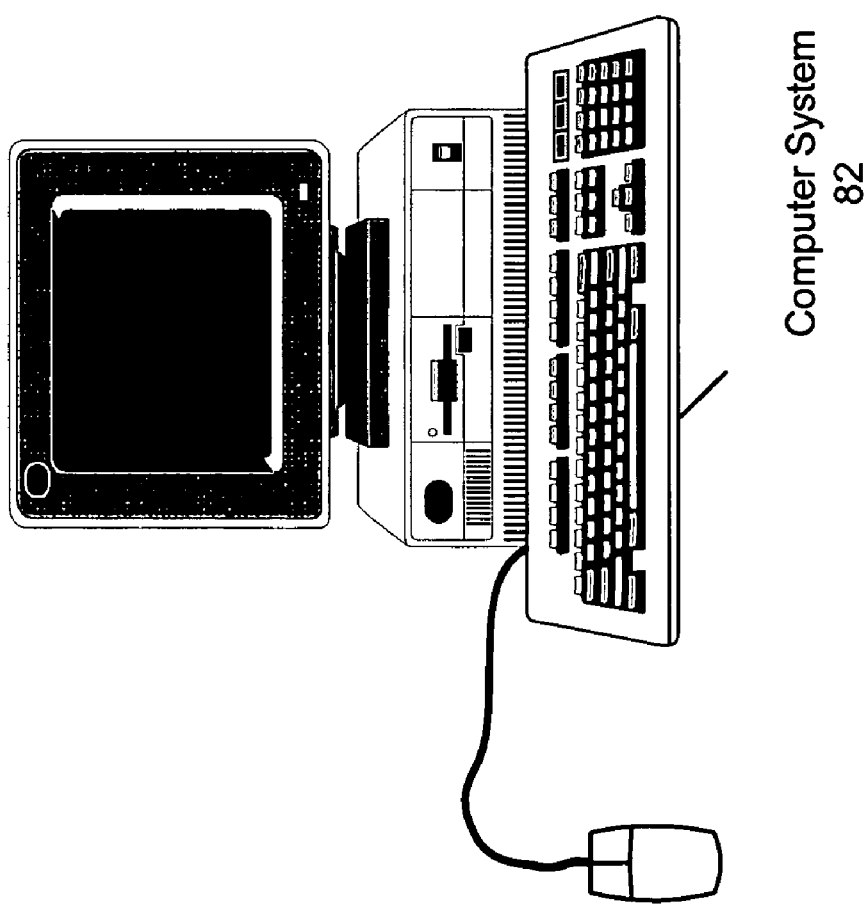
FIG. 1A illustrates a computer system suitable for implementing various embodiments of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Provisional Application Ser. No. 60/601,066 titled "Automatic Versioning and Data Mutation of User-Defined Data Types" filed Aug. 12, 2004.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

TERMS

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Data Type—a classification of a particular type or representation of information. Data types may be intrinsic to a programming language, e.g., integer, character, etc., and/or user-defined, such as, for example, AccountRecord, ChannelName, and so forth. Data types can be atomic, i.e., specifying a single, simple data object, such as an integer, or may be compound, such as an array of integers, a character string, or a user-defined type that includes multiple data elements of the same or different data types. A data type definition specifies the size of an element of that type, e.g., 16-bits, as well as the structure of the element, e.g., the order and content of a compound data type. A data type is a type of data, not the data itself, i.e., data elements of a data type must be instantiated.

Class—a form of compound data type that may specify an ordered list of component data types, and may also include methods (e.g., member functions) that may access and/or operate on the components. In some systems, classes may be heritable, i.e., a "child" class may inherit component data types and methods from a "parent" class, and may add data and/or add to or modify the methods as desired. A class (definition) defines a type of data or object, and is not the object itself, i.e., objects of a class must be instantiated.

Array—a sequential list structure that includes a variable number of one or more data elements. These elements may be all of the same type (a homogenous array) or of differing types (a heterogeneous array). When the elements are of differing types, there is generally some common parent type from which all the element types are derived, such that the array can be said to be a homogenous array of that common parent type. For example, a list of dogs may include many types of dogs, such as German shepherds, Cocker Spaniels and Dalmatians.

Cluster—a structure that includes a fixed number of multiple data elements, optionally of different data types.

Aggregate—a collection of data elements, e.g., an array or cluster.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc. Graphical software programs which perform data acquisition, analysis and/or presentation, e.g., for measurement, instrumentation control, industrial automation, modeling, or simulation may be referred to as virtual instruments (VIs).

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1A—Computer System

FIG. 1A illustrates a computer system 82 operable to execute program instructions implementing embodiments of the present invention. One embodiment of a method for automatic versioning and data mutation of user-defined data types is described below.

As shown in FIG. 1A, the computer system 82 may include a display device operable to display an interface, such as a graphical user interface (GUI), facilitating interactions between a user and software executing on the computer system 82. For example, the graphical user interface may comprise any type of graphical user interface, e.g., depending on the computing platform.

The computer system 82 may include a memory medium (s) on which one or more computer programs or software components according to one embodiment of the present invention may be stored. For example, the memory medium may store one or more programs, e.g., text-based programs or graphical programs, which are executable to perform the methods described herein. Also, the memory medium may store a programming development environment application used to create and/or execute such programs, also referred to as an integrated development environment (IDE). The memory medium may also store operating system software, as well as other software for operation of the computer system. Various embodiments further include receiving or storing instructions and/or data implemented in accordance with the foregoing description upon a carrier medium.

Figure 1B:
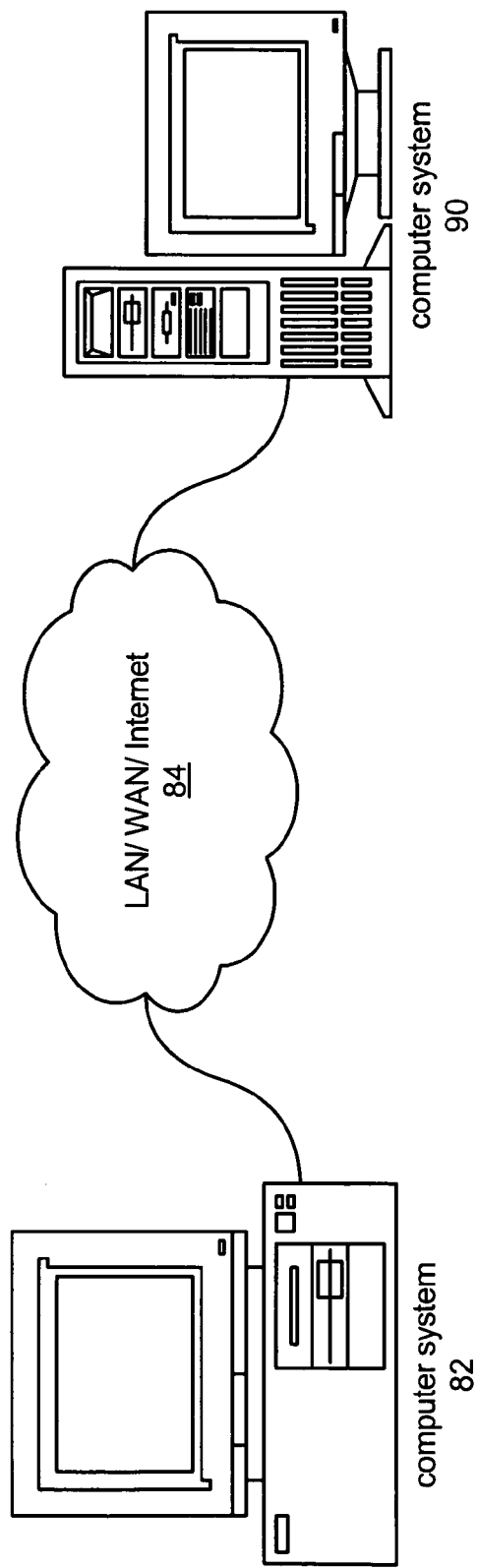
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program in a distributed fashion. For example, computer 82 may execute a first portion of the program and computer system 90 may execute a second portion of the program. As another example, computer 82 may display the user interface of a program and computer system 90 may execute the functional or application portion of the program.

In some embodiments, the program development environment or IDE may be the LabVIEW graphical program development environment provide by National Instruments Corporation, and the programs described herein may be graphical programs developed in the "G" graphical programming language also provided by National Instruments Corporation. For example, as described above in the glossary of terms, a graphical program comprises a plurality of interconnected nodes or icons, wherein the plurality of interconnected nodes or icons visually indicate functionality of the program. These interconnected nodes form a block diagram. In some cases, the graphical program may also include a user interface portion, referred to as a GUI or front panel, which includes one or more controls or indicators for human interaction with the program. Further details regarding graphical programming may be found in the various patents incorporated by reference above.

In one embodiment, the graphical user interface of the graphical program may be displayed on a display device of the computer system 82, and the block diagram may execute on a device 190 connected to the computer system 82. The device 190 may include a programmable hardware element and/or may include a processor and memory medium which may execute a real time operating system. In one embodiment, the graphical program may be downloaded and executed on the device 190. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
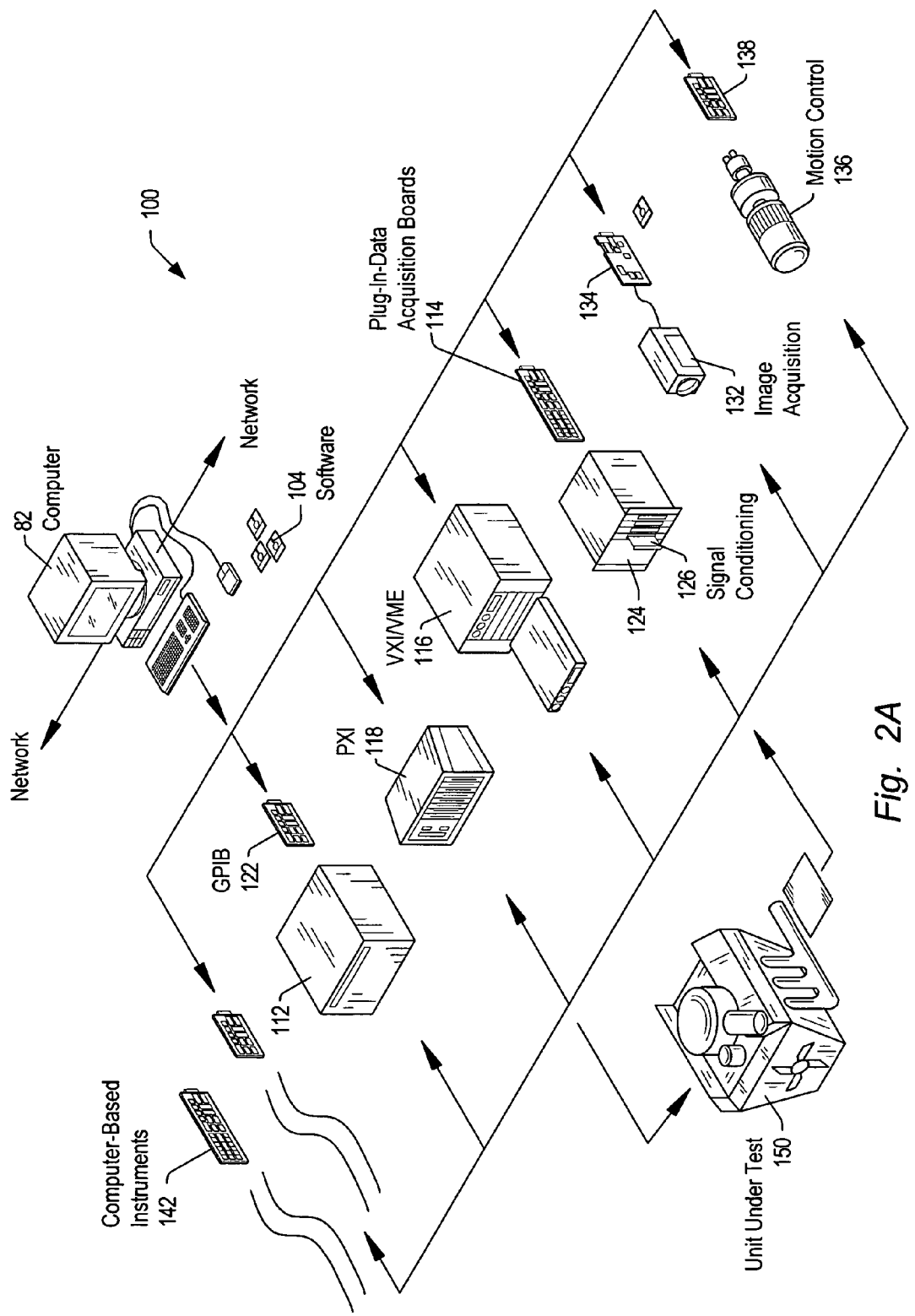
FIG. 2A illustrates an instrumentation control system according to one embodiment of the invention.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others. While the techniques described herein are illustrated in terms of various industrial applications, it should be noted that they are broadly applicable to any program application or domain.

Figure 2B:
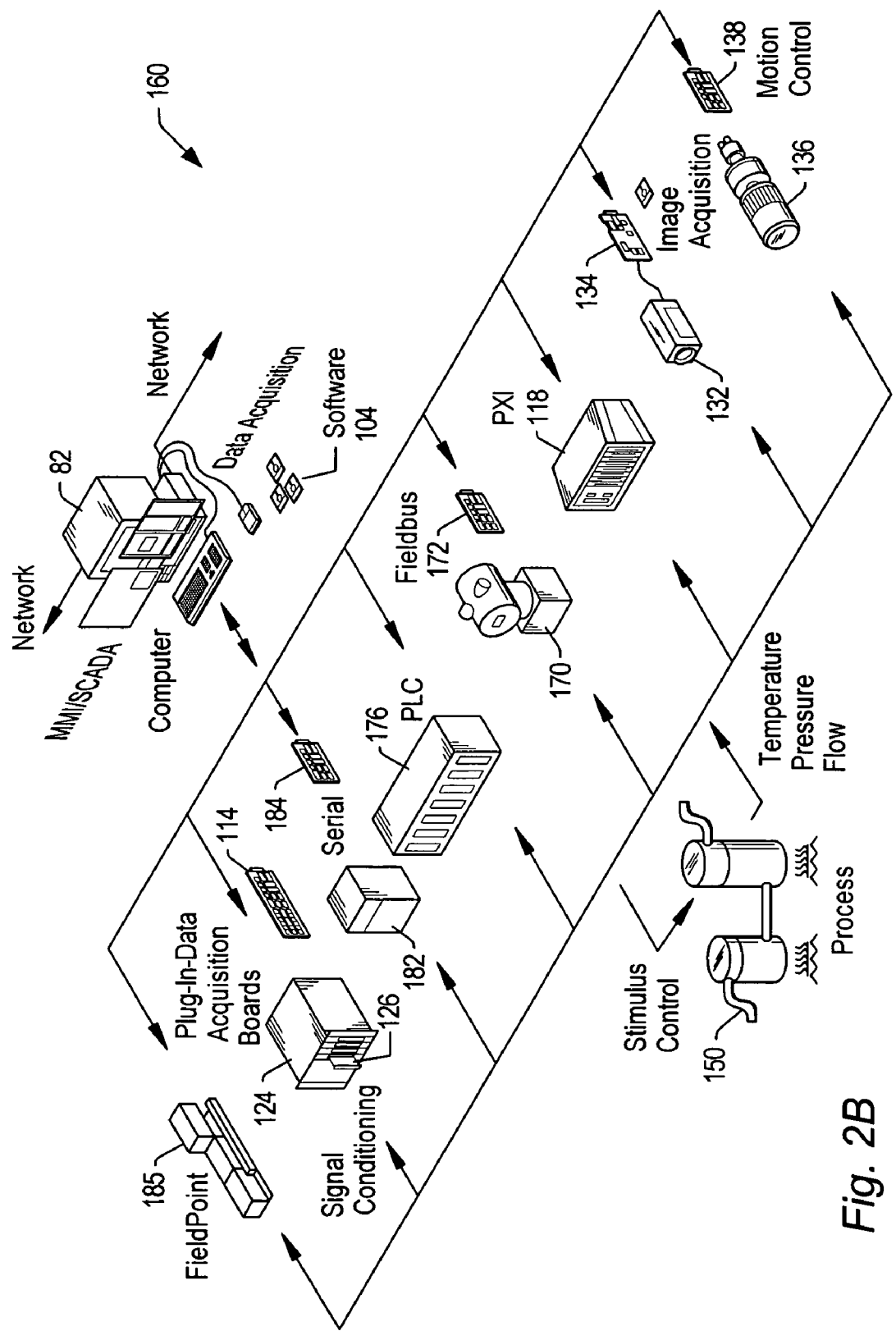
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3:
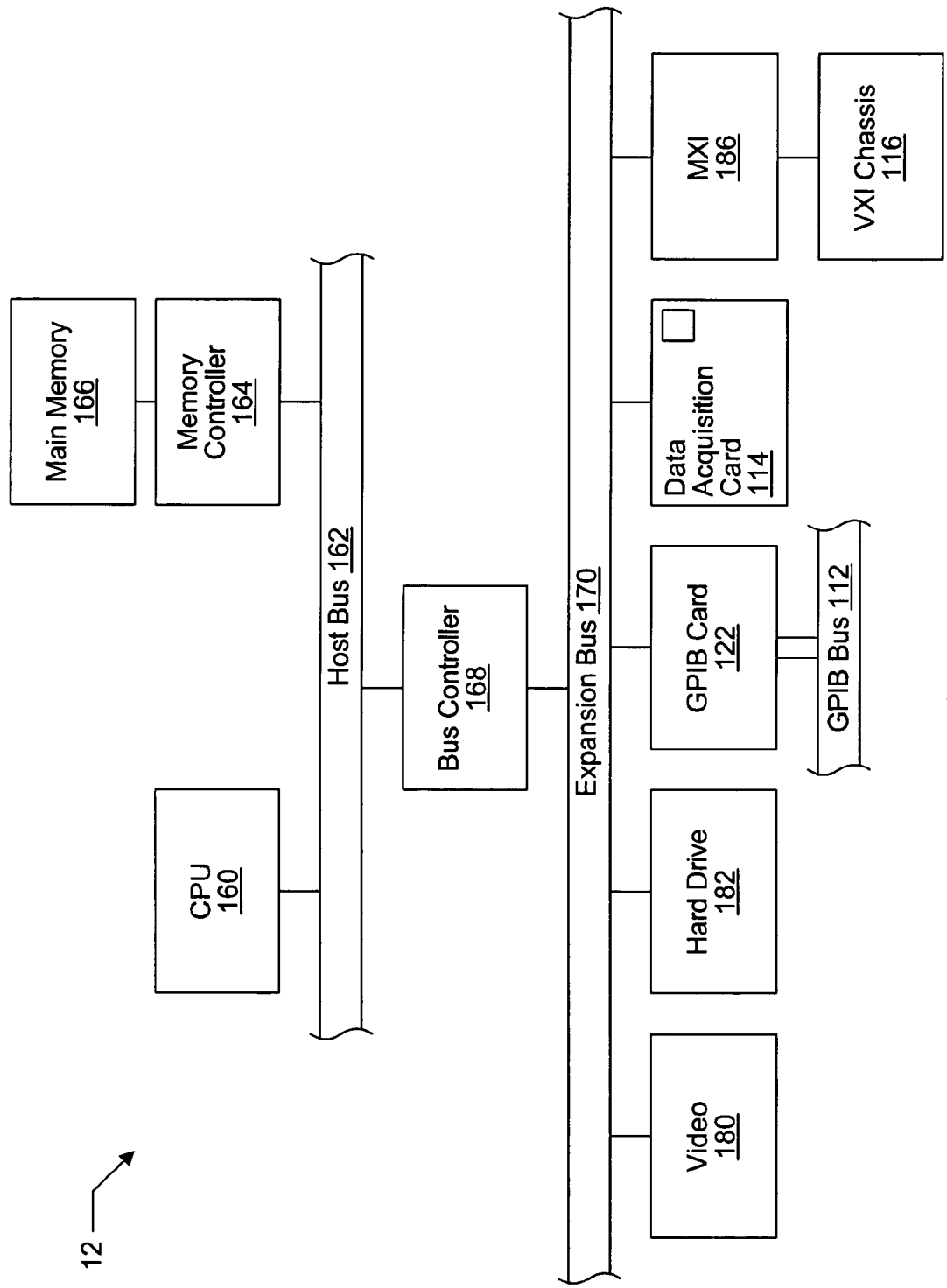
FIG. 3 is an exemplary block diagram of the computer systems of FIGS. 1A, 1B, 2A and 2B.

FIG. 3—Computer System Block Diagram

FIG. 3 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 3 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store a program development environment and one or more programs in accordance with various embodiments of the present invention. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a program to the device 190 for execution of the program on the device 190. The deployed program may take the form of a text-based program, or may comprise a graphical program. The deployed graphical program may comprise graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 4:
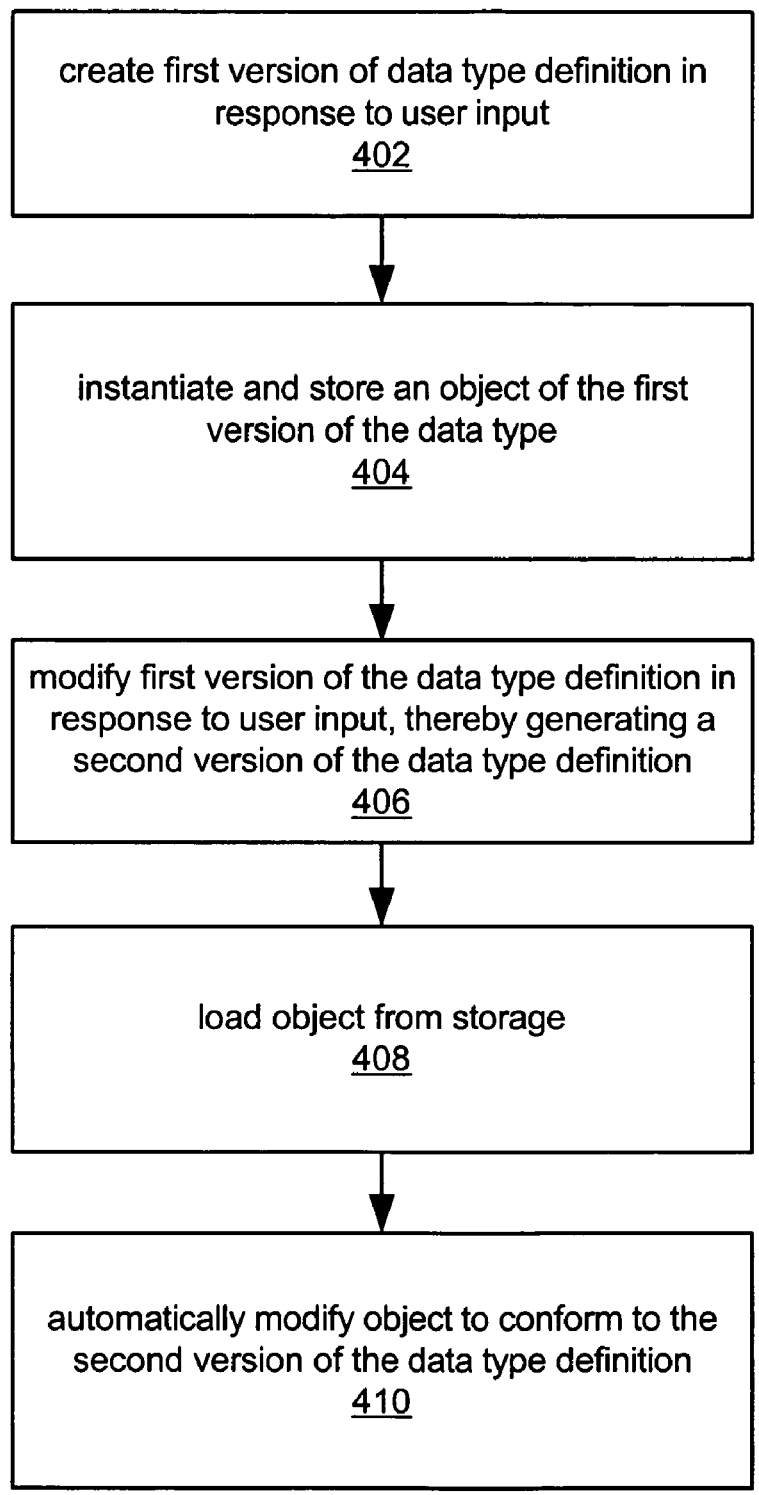
FIG. 4 is a flowchart diagram illustrating one embodiment of a method for automatic versioning and data mutation of user-defined data types, according to one embodiment.

FIG. 4—Method for Automatic Versioning and Data Mutation

FIG. 4 illustrates one embodiment of a method for automatic versioning and data mutation of user-defined data types, where the functionality described is implemented in and performed by embodiments of a programming development environment, including a programming language. In other words, the method describes functionality intrinsic to the language/environment, rather than functionality developed by an end user. The method shown in FIG. 4 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 402, a first version of a data type definition may be created in response to user input. In other words, a user may provide input to an editor, wizard, or other tool comprised in or operating in conjunction with the program development environment, where the input defines or specifies a user-defined data type. For example, in one embodiment, the user input may define a class, with one or more data elements, i.e., member data, and/or one or more methods or member functions.

In one embodiment, a class definition, e.g., class data, may comprise an ordered list of component data types, and may also include functions or methods that may access and/or operate on the components. These component data types may be any built-in data type or user-defined types.

For purposes of explanation, consider an example class A with the following initial components:

an unsigned 32-bit integer (e.g., uInt32) named Alpha;
a second uInt32 named Beta;
a cluster [or "struct" in the C language parlance] named Gamma, comprising:
    a floating-point double named Delta; and
    a uInt32 named Epsilon; and
a double named Zeta.

Note that in some embodiments, a class type used as a component may be treated as an opaque type, that is, its own component types may not be modified individually. The class itself preferably has defined mutation functions for itself. A structure that merely amalgamates several types together and is not itself a coherent class type with defined behavior may have its individual components modified during the mutation. The above example cluster named Gamma is such a structure.

In 404, an object of the first version of the data type, e.g., an object of class A as initially defined, may be instantiated and stored, where the object includes a version identifier (ID) indicating the version of the object. For example, the object may be instantiated and included in a program, and subsequently stored, e.g., with or without the program. It should be noted that as used herein, the term "object" refers to any type of data structure instantiated or created based on a defined data type, e.g., based on a data type definition, as is well known in the art of programming. In this example, the object's version ID indicates that the object is of the first version of the data type. Note that the version ID may be of any form desired, including, for example, a name or alpha-numeric designation, or a date, among others, and may indicate version ordinality, e.g., first, second, etc., version chronology (date/time, etc.), bus or device compatibility, or any other information relating to the data type.

In some embodiments, a plurality of objects may be instantiated, e.g., and included in the program and/or in one or more other programs, and subsequently stored. In other words, multiple objects of the first version of the data type may be instantiated and included in one or more programs. In some embodiments, the programs (and thus the objects) may be stored or deployed onto a plurality of devices, e.g., computer systems. In preferred embodiments, the plurality of devices may be coupled to the computer system 82, i.e., the host computer system, over a bus or network, e.g., a LAN, WAN (e.g., the Internet), wireless network, etc.

As is well known in the art, data objects may be stored, e.g., in non-volatile memory, in a modified form for efficiency reasons. For example, a data object may be "flattened", where most or all of the structural or formatting information for an object (data structure) is stripped from the object, leaving only or primarily the data itself, i.e., the actual values of the data elements of the object. The flattened data (i.e., the flattened object) may then be stored, e.g., in non-volatile memory, e.g., a hard drive, floppy drive, EEPROM, or any other type of non-volatile memory, for later retrieval, described below.

Thus, in some embodiments, the method may include storing the instantiated object in non-volatile memory. In a preferred embodiment, storing the instantiated object in non-volatile memory includes flattening the object, described in more detail below. Note that in various embodiments, the non-volatile memory may be comprised in the computer system 82, or alternatively, may be comprised in a device coupled to the computer system 82 over a network, such as another computer system 90, a network storage device, or any other device with non-volatile storage means.

In 406, a second version of the data type definition may be created in response to user input. In a preferred embodiment, the first version of the data type definition may be modified in response to user input, thereby creating the second version of the data type definition. For example, the user may provide input to the editor, wizard, or other tool comprised in or operating in conjunction with the program development environment, specifying changes to the first version of the data type definition, where the changes may include one or more of: adding a data field or member variable, subtracting a data field or member variable, reordering two or more data fields, and changing inheritance, where changing inheritance refers to changing the parent class or parent data type of the first version of the data type definition.

As previously noted, automatically generating functions for converting the data format of one version of a class into the next version of a class is generally non-trivial. It does not suffice to have a mechanical process that analyzes the "before" and "after" images of the class, i.e., a difference or "diff" function. Thus editing a class or data type definition in a plain text editor does not collect sufficient information to automatically generate the mutation functions. However, in an integrated development environment (IDE), if a specific interface for editing the class is provided, sufficient information may be gathered to perform this generation from nothing more than the user input that the user provides to edit the class in the first place. A primary feature of one embodiment is the ability to recognize the edits that are made to the class as the edits occur so that the same or corresponding edits may be applied later to the individual instance objects.

In a preferred embodiment, modifying the first version of the data type definition in response to user input may include performing a first one or more editing operations on the first version of the data type definition. However, as noted above, simply editing the definition in a standard text editor would not facilitate generation of appropriate mutation functions that effectively recapitulate the editing operations. Thus, in one embodiment, the user may clearly denote that he/she is editing the class data. This is significantly different from most text-based programming environments in which the user simply types new text into the class definition. In one embodiment, without this denotation, the user may not be allowed to edit such class definitions.

Modifying Components of a Class

Each component of the class data preferably has a known position in the list that makes up the composite type. These initial positions may be recorded either as part of each component or in an associated structure, such as a list, although it is noted that any other type of structure or means may be used to maintain this position information. The position record preferably includes data types inside clusters. Thus, in the example class from above, a position list may record Alpha in position 0, Beta in position 1, Gamma in position 2, Delta in position 3, Epsilon in position 4 and Zeta in position 5.

In preferred embodiments, the components of the class may be presented to the programmer in such a way that the ordering of components is obvious. Additionally, editing actions to a particular component, e.g., changing its data type, renaming it, or deleting it, may be distinguished from editing actions that reorder the list or add new elements. In embodiments related to a graphical programming language, drag and drop (reordering/adding) and popup menus (edits to a particular component) are natural choices that include this distinction. Text-based programming/editing may require various limitations on what would otherwise be free-form editing. For example, edit operations may be effected via dialogs, menus, wizards, or other means.

As the programmer edits the class definition, the list of original positions may be maintained. The following describes example edit operations that may be applied to the class components, and that may be recognized by the environment, along with corresponding operations performed on the position list:

Component renamed. If the edit is to rename a component, the position list entry may reflect the new name. One solution is to edit the list and replace Alpha with Omega. However, note that it is possible in the course of editing the class for two elements to have the same name, as happens, for example, when two components need to exchange names. Thus, a unique identifier may be used (e.g., an address in memory is one valid choice) as the name in the position list, specifically not the programmer visible name, because otherwise there may be no way to distinguish edits to entries of the same name. However, for clarity and ease of understanding, the standard (programmer-defined) names will be used in the following descriptions. Note that since the identifier is unique and distinct from the name the programmer sees for the component, there is no need to edit the position list.

Component removed. If the component is deleted, delete its entry from the position list.

Component added. If a new component is added, do not modify the position list in any way.

Component moved/List reordered. If any edit moves the elements around and changes the ordering of the list, do not modify the position list in any way.

Component replaced. If an existing component is replaced by a new one (generally for the purposes of changing data type of the component), the new component may be added to the position list with the same initial position value as the replaced component, and the replaced component may be deleted from the component list. This is distinct from the rename operation, as the new component likely cannot have the same unique identifier as the previous as they must momentarily co-exist while the editing operation is performed.

It should be noted that the specific edit operations described above are meant to be exemplary only, and are not intended to limit the edit operations contemplated to any particular name, form, or function. For example, the above edit operations are directed to modifications made to components in the class. Other edit operations are also contemplated, including for example, modification of inheritance relations, described in more detail below.

Once the editing of the class definition is complete, the programmer may clearly indicate when he/she is done editing the class, e.g., by indicating some form of a commit signal (classically, an OK button, though other may be used as desired) to let the programming environment know that the new version is complete, and that the mutation function(s) may now be generated. In one embodiment, the version number of the user-defined class, recorded in the class definition, may be incremented. Further details regarding the version number are provided below.

In one embodiment, the one or more editing operations may be recorded, and a first one or more default mutation functions automatically determined or generated based on the one or more editing operations.

For example, in one embodiment, the mutation function may be generated as indicated by the following pseudocode. As may be seen, the pseudocode approximates C syntax and should be readily understandable to those skilled in the art of software programming. Note that the pseudocode shown is meant to be exemplary only, and is not intended to limit the mutation function generation to any particular programming language or technique.

```
void GenerateMutationFunction(ListOfComponents prevList,
                ListOfComponents nextList,
                ListOfPositions originalPositionList) {
    uInt32 nextMemoryOffset = 0;
    GenerateMutationFunction_Recurse(prevList, nextList,
&nextMemoryOffset, originalPositionList);
}
void GenerateMutationFunction_Recurse(ListOfComponents prevList,
                ListOfComponents nextList,
                uInt32 *nextMemoryOffset,
                ListOfPositions originalPositionList) {
    for (each component CNew in nextList) {
        bool setToDefaultValue = TRUE;
        if (CNew is in originalPositionList) {
            Get the original position of CNew.
            From prevList, get the component COld that is in the
               position.
            Calculate the memory offset of COld in the overall
               structure. Call this prevMemoryOffset.
            if (CNew is of the same data type as COld) {
                Generate the language specific code to copy
                   from (SOURCE_BASE_POSITION + prevMemoryOffset)
                   to (DESTINATION_BASE_POSITION +
                   *nextMemoryOffset)
                setToDefaultValue = FALSE;
```

```
        }
        else if (CNew is of a compatible/convertible type as COld) {
            Some data conversion is required, such as
                converting an integer value to a floating-
                point value.
            Generate language specific code to do conversion
                from type CNew to COld
                from (SOURCE_BASE_POSITION + prevMemoryOffset)
                to (DESTINATION_BASE_POSITION +
                *nextMemoryOffset)
            setToDefaultValue = FALSE;
        }
        else if (CNew is a cluster [struct] type AND COld is cluster
            type) {
            In this case, each individual part of the cluster has
a chance to mutate, e.g., something deep in the cluster may be replaced
with a new type, while all the other elements of the cluster should copy
normally, and so, recursion may be used.
            GenerateMutationFucntion_Recurse(COld.listOfSubComponents,
            CNew.listOfSubComponents, *nextMemoryOffset,
            originalPositionList);
                setToDefaultValue = FALSE;
            }
        if (setToDefaultValue) {
            No conversion is possible between the old data and the new
data OR CNew did not appear in the original position list, so it has
never been set.
            Generate language specific code to
                set (DESTINATION_BASE_POSITION+*nextMemoryOffset)
                to the default value for the component as specified
                by the class definition or to the default value for
                the data type -- the choice of which to do is
                language dependent.
            Note that if data was in the previous version but was not used in
            the new version, that data simply does not get referenced at any
            point.
            }
        }
}
```

Modifying Inheritance Relations

As noted above, in addition to component-related edit operations, in some cases, the developer may change other aspects of the class, such as inheritance relations, where, for example, the parent class of the class may be changed.

The editing operation of changing the parent class may be a distinct action recognizable by the environment, e.g., the IDE, just as with the editing of the component types described above. In text languages, it may suffice for the IDE to be aware of the line of text that defines the parent and note when that line changes, however, in some embodiments, a sign of commitment, e.g., selection of an "OK" button or equivalent, may be required indicating that the programmer wishes to commit to having a new version of the class, and that the mutation function is to be generated. In a graphical programming language where changing the parent type is a deliberate, obvious action, a separate explicit sign of commitment may not be necessary.

In one embodiment, the programmer may modify the inheritance relation of the class in the following manner:

The programmer may indicate a desire to change the parent class, specify the new class, e.g., via a user interface, and then commit the change. The version number on the class may be incremented, and the mutation function generated as follows:

If the edit inserts a new parent (or multiple new parents) into the class hierarchy, such that the new parent's parent is the same as the old parent (or similar for multiple inserted new parents), the data for the new parent may be initialized by setting all fields of the new parent to the default value for the class.

If the edit removes a parent (or parents) from the hierarchy, the data for that level (or levels) may simply be dropped when mutating to the new version.

For all edits replacing one parent with another, the default value for the new parent may be used. Note that in this case, the programmer may be prompted to provide a mutation function between the old parent and the new parent. In one embodiment, the programmer may be given the opportunity by the programming environment to provide a mutation function that overrides any of the automatic mutations specified by this patent. However, this custom override of mutation functions is an optional feature, and may not be supported in some embodiments of the present invention.

It is noted that the automatic mutation function generation described herein may allow novice programmers access to very complex operations without facing a steep learning curve.

Once the first one or more mutation functions have been determined or generated, first mutation information indicating or including the first one or more default mutation functions may be stored in the second version of the data type definition. Thus, in one embodiment, the second version of the data type definition may include the first mutation information indicating or including the first one or more default mutation functions for automatically converting objects conforming to the first version of the data type definition to objects conforming to the second version of the data type definition.

Note that the first one or more default mutation functions preferably correspond to the editing operations used to generate the second version of the data type definition. Thus, the second version of the class or data type definition may include information or functions (i.e., mutation information) which may effectively recapitulate the modifications to the first version that resulted in the second version, and which may be used to convert objects of the first version to objects of the second version, further details of which are provided below.

Flattening the Object

The method elements presented above (402-406) describe the creation of mutation functions for converting the object from one version to a subsequent version, according to one embodiment. The method steps presented below describe storing and retrieving object data, according to one embodiment. In retrieving the object data, data mutation may be required due to the fact that the data type definition has been changed since the object was instantiated and stored. However, in order to apply the data mutation correctly, information about which version of the data the object has may be stored with each individual piece of object data.

There are numerous techniques for recording the version information of the object data. In preferred embodiments a set of data may be stored that supports arbitrary mutation at any level of the class or object hierarchy, from any previous version of the class to any future version of the class, and a loading method that ensures that the mutations are applied in the correct order. This formatting of the stored object and the mutation process may be performed without input from the user of the class and without requiring bookkeeping from the programmer of the class. Note that a distinction is drawn between the user of the class and the programmer of the class: the programmer is the person who edits the class (as described in 406 above) and establishes the mutation behavior (either through the automatic mutation mechanism described earlier or through some function he/she specifies). The user is someone who instantiates instance data of the class as part of some application. Although the programmer is likely a user of the class, there are likely many users for a class that had nothing to do with the design of that class.

Mutation History Stored in Class Definition

Generally, the class is defined in a source file of the programming language. As noted above, the techniques described herein preferably operate in the context of an integrated development environment where changes to the class and its inheritance may be detected and noted (as described above). While in some embodiments, the language itself may not support the automatic function generation described above, the editing environment should have the capability and control over the saved source code to record information on behalf of the programmer without the programmer having to explicitly enter the information. In other words, the environment needs to know when the version number for the class changes and record the mutation history for the class as part of the class definition. This mutation history may be critical for identifying which mutation functions are associated with which versions of the class, and may comprise a list of mutation records, each record describing what changes occurred between versions.

Thus, the mutation record may comprise a list of each version increment a user-defined class has gone through and the reasons for that increment. Each entry into the table may include some or all of:

- class version number;
- type descriptor of private data cluster;
- default value for private data of the class;
- name of parent class;
- custom flatten function information;
- language version number (distinct from class version, this is the compiler/execution system's version number); and/or
- user comments (optional for a given language implementation).

These fields cover information that may be necessary for the mutations described herein, although additional fields may also be included to cover further mutations, as desired or required.

Thus, a class records its own mutation history within its definition, and may also keep a copy of the mutation history for all of its ancestors. When a class is edited to have a new parent, the editing environment may detect this and copy the mutation history for all new ancestors into the class. If any mutation history for a class already exists, the most recent records may be used. The complete list of all mutation histories for all ancestors is herein referred to as the genealogy tree.

FIG. 5—Example Mutation Record

FIG. 5 illustrates a sample mutation record for an example class PairOfNumbers. Note that the embodiment shown, there is much replication of data in the table. Some implementations may replicate on every line to obviate searching for the last time a given set of data changed. If the size of the module file becomes an issue, the table may be optimized to reduce duplication. The mutation record may be visible to users. Note that these optimizations are optional and constitute neither a significant change from the type of information stored in the table, nor a deviation from the concept of storing such mutation history as part of the class definition.

In some embodiments, the genealogy tree may not be visible to users. The genealogy tree may comprise a list of mutation records. Initially, it may contain only one mutation record, the one for the user-defined class itself. When a user-defined class changes parents, it has a current parent and a new parent, and may copy the entire genealogy tree of all current ancestors into its own genealogy tree. Thus, in some embodiments:

Initially Child inherits from Parent, and Parent inherits from a based class, e.g., a Flow Object. GrandParent and OtherGrandParent both inherit directly from Flow Object. All four types have only themselves in their respective genealogy trees. Flow Object is special, being a base class, and has nothing in its genealogy tree.

Parent changes to inherit from GrandParent. Nothing is copied because Flow Object has no tree.

Parent changes to inherit from OtherGrandParent. Before it does so, it copies GrandParent's genealogy tree into its own. Parent's Tree now includes information on GrandParent and Parent.

Child now changes to inherit directly from Flow Object. It copies Parent's genealogy tree into itself (picking up Parent and GrandParent). It also copies OtherGrandParent's Tree (picking up only OtherGrandparent). If there are other layers of hierarchy, it may add these as well. If two genealogy trees have entries for the same type, the entry that has the most recent version recorded may be retained.

The genealogy tree may be critical to the unflattening process. Again, this looks like a large block of data over time (history of all previous ancestors and the mutations on those ancestors). But though the records could get extensive in theory, changes in inheritance are extremely rare in OO programming and most objects may only ever store their own mutation record. By creating this record in each module, the need to keep old modules around when unflattening old data maybe eliminated, and so the overall size of the flat data for user-defined classes may be decreased. Also, because this genealogy tree only needs to be loaded into memory when old data is actually encountered, as more and more data is mutated to the most recent version of the module, the tree may be loaded less often.

Format of Stored (Flattened) Form

For purposes of explanation, assume that there exists a class C that inherits from class B that inherits from class A. Thus the data in any object of type C comprises all the components in A, concatenated with all the components in B concatenated with the components of C. In some OOP languages there exists a single class that is the ultimate base class, the first ancestor of all objects, which has no fields, no methods and inherits ex nihilo. Not all languages have an ultimate base class. Java and LabVIEW do, C++ does not. In a LabVIEW implementation, A may be assumed to inherit from the base class of the class hierarchy of the environment (e.g., LabVIEW), specifically, a Flow Object.

When object data is stored, at least a portion of the following information may be recorded:

"NumLevels": The number of levels of hierarchy between the object's class and the first ancestor, not including the ultimate base class (e.g., Flow Object). In one embodiment, this value may be an unsigned 32-bit integer, although any other means may be used as desired. In one embodiment, if NumLevels is zero, nothing else follows, i.e., a value of zero indicates that this is an instance of the language's ultimate base class. Thus, a language without an ultimate base class may never have a zero in this position. In the example object hierarchy from above, an instance of class C may record "3", one each for C, B and A, but not counting the base object class, e.g., the Flow Object.

"ClassName": An identifier for the object's class. In the example above, this may be an identifier for "C." The identifier may be as simple as a filename, if that is sufficiently unique for a language, or as complex as a Globally Unique Identifier (GUID). This identifier indicates the class that should be loaded to unflatten the data.

"VersionList": A series or list of numbers interpreted as version numbers for classes. There are "NumLevels" of these version numbers in this list. In one embodiment, the list starts with the version of the child class (named in ClassName) and proceeds to the version of the oldest ancestor (not including the ultimate base class, if any). Because the genealogy tree of the class may be stored as part of its definition, the history may be available to provide the name of the parent class for each child class version. The genealogy tree may be used to determine the names of each ancestor. In the above example, if the numbers in the version list are 2, 1, 3, then the 2 refers to the version of C. The genealogy tree may be examined to determine that for version 2 of C, the parent was B, and so 1 is the version of B, and so forth.

Note: In some embodiments, the complete name (or unique identifier) of each level of hierarchy may be recorded in each instance of flat data, rather than relying upon the class definition to contain that information. This, as with several other alternative embodiments, may result in a general bloat of the data storage space required. Thus, to minimize the required space of flat data, redundant information may be moved into a library.

"Data": This segment is the actual data of the object, viewed as a sequence of chunks of serialized data, one for each level of the hierarchy (NumLevels). These chunks may be recorded in ancestor-to-descendent order, i.e., in the opposite order of the versions. In some embodiments, a facility may be provided for recording "empty string", where no data for that level was recorded, thus indicating that the default value for that level of the hierarchy should be used.

The data described above may be embodied in any number of ways. For example, the data may be stored in binary, in a markup language such as XML format, or any other format as needed, and other string formats containing the same information described above may be added to suit future needs. The following describes an example implementation using XML.

FIG. 6—Flattened Object in XML Format

As noted above, in some embodiments, a markup language may be used for user-defined classes. FIG. 6 illustrates a sample of a flattened Object formatted in XML, according to one embodiment. Note that each level of the hierarchy may output whatever information is needed to record its level.

In 408, the object may be loaded from storage. For example, loading the object from storage may include reading the object from non-volatile memory. In embodiments where the object has been flattened, reading the object from the non-volatile memory may include "unflattening" the object. As is well known in the art, unflattening an object refers to retrieving flattened data, e.g., a flattened object, and creating a corresponding object with the data, i.e., populating an instantiation of the object with the retrieved data.

In the descriptions below, the object has been previously instantiated and stored (see 404 above), e.g., in non-volatile memory, and may have been flattened as well.

As noted above, in some situations, between the storing and the loading of the object, the definition of the data type of the object may have been changed, e.g., as described in 406 above. Thus, in 410, the object may be automatically modified to conform to the second version of the data type definition, where the automatically modifying is performed without user intervention. Said another way, upon retrieval from storage, e.g., upon or during unflattening, the object data may be modified and used to populate an object of the second version of the data type definition. Thus, for example, if data fields were reordered in the second version, the corresponding data elements retrieved from storage may be reordered accordingly in the reconstituted object. Similarly, if a data field were omitted in the second version, the corresponding data element may be omitted in the object, and so forth.

Automatically modifying the object may include executing the first one or more default mutation functions, described above. For example, in one embodiment, automatically modifying the object to conform to the second version of the data type definition may include analyzing the included first mutation information to determine the first one or more default mutation functions, and executing the first one or more default mutation functions to modify the object to conform to the second version of the data type definition.

Determining the first one or more default mutation functions based on the analysis may be accomplished in various ways. For example, in one embodiment, the first mutation information (included in the second version of the data type definition) may include the first one or more default mutation functions, and so the functions may simply be read or retrieved. In another embodiment, the first mutation information may include function scripts that may be used to generate the functions. In yet another embodiment, the first mutation information may include names or references to the first one or more default mutation functions, whereby the functions may be called to perform the modification of the object (e.g., the object data).

Further details of the loading/unflattening process are provided below.

Process for Loading Stored Class Data

The class data stored in the format described above, whether in binary string, XML format, or data base tables, may be loaded by the language's execution system into any future version of the class, provided that the mutation history has been recorded by the language's development environment. One embodiment of an unflatten procedure for a user-defined class is described by the following pseudocode:

```
MgErr Unflatten(LVDataReader lvdr, UPtr dataDestination) {
    if (dataDestination == NULL) {
        Read all bytes;
        return noErr;
    }
    *(int32**)dataDestination = NULL; // start off in a deflated state
    OMObjTypedefInstPtr *dest = (OMObjTypedefInstPtr
        *)dataDestination;
    Read numLevels (uInt32);
    if (numLevels == 0) {
        classPtr = Get ultimate base class (Flow Object);
        dest->InflateDefault(classPtr);
        return noErr;
    }
    Read moduleName (PStr, CPStr, LStr, whatever this turns out to be);
    classPtr = AddOrGetClass(moduleName);
    if (!classPtr) { // couldn't load the class
        Create pointer to a block of data. Copy the numLevels and
        moduleName into it. Now read all bytes from the lvdr (version
        list, and then all the size-datablock pairs) and append them
        to the datablock, resizing when necessary.
        dest->ptr->mDataspace = datablock;
        dest->ptr->mDataType = NULL;
        return classNotFoundError;
    }
    Read version list. Version list is in child-type-to-parent-type order.
    Use the geneology tree of ClassPtr to identify which class each version
    number in the list goes with. Create a stack of Mutations {
        current Mutation Record = classPtr's own info in geneology tree;
```

-continued

```
    for (number of items in version list) {
        Mutation x = current Mutation Record, indexed by Ith version;
        if no entry for version
            return corruptFlatDataError;
        Push x onto mutation stack;
        current geneology tree entry = in classPtr's geneology tree,
                        search for x->Name of parent;
        if (cannot find parent name in geneology tree)
            return corruptFlatDataError;
        }
    }
    Ok, so we have this stack of mutations. Let's see what the class looks
    like today. Inherit from the OMClass::VisitorMgErr and create an
    UnflattenVisitor class.
    UnflattenVisitor uv(lvdr, dest, mutationStack, numLevels,
        moduleName, versionList, onGoingDatablock, classPtr);
    err = uv->GetError( );
    if (err) {
        dest->Deflate( );
        dest->InflateDefault(classPtr);
    }
    return err;
}
The preVisit and postVisit functions look as follows:
private fields:
    mMutations -- the mutation stack
    mDest -- destination object instance
    mDatablock -- as each block is unflattend, we store a copy
            of the flat form in this block so it can be
            handed to the custom mutate unflatten VI in
            the "unused parent data" section.
    mVersionList -- the verison list we read earlier
    mNumLevels -- as above
    mModuleName -- as above
    mDataReader -- lvdr
    mFirstVisited -- stored classPtr in constructor
            so we know when we reach bottom of tree
// Just climb up family tree, stopping before we get to Flow Object
MgErr UnflattenVisitor::PreVisitCore(OMClass *parentVisited,
    Bool32 &keepGoing){
    keepGoing=((OMObjTypedefPtr)parentVisited)->GetParent( )!=
    UltimateBaseClass( ));
    return noErr;
}
// Climb back down tree, unflattening each level as we go
MgErr UnflattenVisitor::PostVisitCore(OMClass *parentVisited,Bool32
    allVisited){
    OMObjTypedefPtr classPtr = (OMObjTypedefPtr)parentVisited;
    1) Check the mutation stack. if the name of the parentVisited class does
        not appear anywhere in the stack, then we either have an ancestor that
        has been removed OR we have corrupt data. We know data is corrupt
        if parentVisited == mFirstVisited since the last item on the stack
        should be the class we're trying to construct.
        if (not found in stack) {
            if (parentVisited == mFirstVisited)
                return corruptFlatDataError;
            err = mDest->HardDowncast(parentVisited);
                Keep in mind in the previous line that the type of the
            object has to be exactly the same as the level we
            are now unflattening for the purposes of passing to
            the custom unflatten VIs. We do not want
            the virtual dispatch of functions using fields that have not
            yet been initialzied. So hard downcast will append the
            fields of this level to the existing dataspace and change
            out the class pointer (which leads to the virtual function table).
            err = err ? err : Call this level's construct from parent VI if it
                has one (note, if this level doesn't define one, do NOT use
                parent's version)
            return err;
        }
    2) We found a match.
        If (version number of data is greater than classPtr)
            return loadFromFutureError;
        Pop the stack until the match is the top of the stack.
        Each time we pop, read one datasize-datablock pair from
        the LVDataReader.
        Append this to the ongoing datablock. This is unused parent data for
        parent classes that have been removed by recent mutations.
        if (we had to pop even once) {
            if (the version number recorded for this mutation
                equals version number of classPtr)
                // we have unused parents in data but versions do not
                // indicate a mutation??? corruption!
                return corruptFlatDataError;
            Check the number of unused parents against the geneology
            tree. Do the number of skipped blocks match the number of
            parents that should have been removed?
            if (not)
                return corruptFlatDataError;
        }
    3) Unflatten the data (finally!)
        LVBoolean doStandardUnflatten = LvBooleanTrue;
        if (classPtr->HasCustomUnflatten(topOfStack->version( ))) {
            err = classPtr->CallCustomUnflatten(...);
            // ... represents lots of stuff, including &doStandardUnflatten
        }
        if (doStandardUnflatten) {
            err = UnflattenAndOrMutate(...);
            // ... is all the stuff needed to inflate a flattened
            // cluster of private data into mDest's dataspace.
        }
        return err;
}
```

It should be noted that the pseudocode shown is meant to be exemplary, and is presented only for the purpose of explanation of the general process.

A user-defined class module preferably has a flat string representation. As is well known in OOP with inheritance, a given object may have numerous ancestors, e.g., a parent, a grandparent, a great-grandparent, etc., and thus may be comprised in an object hierarchy. In one embodiment, each level of the object hierarchy may be redefined without impacting child levels. The mechanism for unflattening each level of the hierarchy may be able to determine which segment of the flat data was written by which level of the hierarchy, and so use that level to reconstruct the object.

Storage of Versioning/Mutation Information

Thus, given a set of flat data, e.g., a flattened object, to unflatten it, information specifying how to perform the unflattening is required. For intrinsic types, this information may simply be the type descriptors for the types. In other words, with the data type specified, the development environment may know how to interpret the data. However, with a user-defined class, there is more to the data than just its type, e.g., inheritance information, version information and possibly user-defined strings.

In various embodiments, the information needed to unflatten a data object may be included in the flat data and/or in the user-defined class module. If some of the information is stored in the user-defined class module, the data may not be unflattened unless the module is available. However, this approach may be preferred if replicating information relevant to the type's version inside every object is to be avoided. Benefits of this approach include the fact that the module provides a location where the information may be stored once, and that it saves on flat data size.

Errors During Unflattening Process

In one embodiment, when data cannot be unflattened, the program or function that uses that data, which in LabVIEW may be referred to as a VI (virtual instrument), may still be opened. For example, the user may open the function and save the function again without losing the data that could not be unflattened. The user may be able to open the function, discover that an object typedef (i.e., class or data type definition) is missing, load that typedef, and automatically have the data be unflattened at that time. The mechanics of how this happens may be invisible to users.

The data in a control might fail to unflatten for several reasons. "Out of memory" or "corrupt data file" can happen with any data. Additionally, in OOP, errors such as "Cannot find module", "Data was written with a more recent version of the module than the version currently in memory", "Cannot find user-defined unflatten function" and "user-defined unflatten function not runnable" may occur. The last two errors may occur when the user writes data using a custom flatten function, and so to unflatten, the custom unflatten function (i.e., a user-defined mutation function) must be available. These errors may be returnable from primitives (e.g., Unflatten From String, Open function Ref, etc.), or may trigger dialog boxes or error window items when loading/saving functions.

Additional Version Changes of the Data Type Definition

It should be noted that the techniques presented above may also be extended to further modifications of the data type definition. For example, the second version of the data type definition may be modified in response to user input, thereby creating a third version of the data type definition. Similar to above, modifying the second version of the data type definition in response to user input may include performing a second one or more editing operations on the second version of the data type definition. The method may further include recording the second one or more editing operations, and a second one or more default mutation functions automatically determined or generated based on the second one or more editing operations. Second mutation information indicating or including the second one or more default mutation functions may then be included in the third version of the data type definition, along with the first mutation information. Thus, the third version of the data type definition preferably includes mutation information which may be used to convert objects of the first version of the data type or the second version of the data type into objects of the third version of the data type.

After the third version has been created or defined, an object of either the first version of the data type or the second version of the data type may be loaded from storage. Note that the object has presumably been previously instantiated and stored, e.g., in non-volatile memory, and may have been flattened as well. The object of either the first version of the data type or the second version of the data type may then be automatically modified to conform to the third version of the data type definition, where, as before, the automatically modifying is performed without user intervention.

In one embodiment, automatically modifying the object to conform to the third version of the data type definition may include determining the version of the object based on the version ID. If the object is of the first version of the data type, the included first mutation information and the included second mutation information may be analyzed, and the first one or more default mutation functions and second one or more default mutation functions determined based on the analysis. The first one or more default mutation functions and the second one or more default mutation functions may then be executed to modify the object to conform to the third version of the data type definition.

If the object is of the second version of the data type, the included second mutation information may be analyzed, and the second one or more default mutation functions determined based on the analysis. The second one or more default mutation functions may then be executed to modify the object to conform to the third version of the data type definition.

Thus, depending on the version of the object, appropriate mutation functions may be determined based on the mutation information, and executed to convert the object to the third version of the data type.

Note that this process may be repeated for any number of successive versions of the data type definition. For example, consider a data type definition that been modified five times, such that the current version is the sixth version. If an object were instantiated (and stored) based on the second version of the data type definition, then loading the object may involve executing mutations functions corresponding respectively to third mutation information, fourth mutation information, and fifth mutation information, in that order.

In some embodiments, the user may be able to specify which version of the data type definition to use when loading the object. Thus, for example, even if the current version of the data type definition were, say, version seven, the user may specify that an object stored according to version three is to be loaded in accordance with version five, in which case the method may determine the appropriate mutations functions to apply based on third and fourth mutation information, ignoring the fifth and sixth mutation information stored in the seventh version of the data type definition.

In one embodiment, mutation information and mutation functions may be specified for rolling an object back to a previous version of the data type. For example, an object instantiated and stored according to version four of the data type definition may be loaded in accordance with a second version of the data type definition. In these cases, the respective mutation functions may be considered "reverse" mutation functions, since they specify or implement reversals of the successive versions of the data type.

Graphical Programs and Programming

As noted above, in some embodiments, the programs described herein may be graphical programs, and the objects may be graphical program objects. A graphical program may be created on the computer system 82 (or on a different computer system) in the following manner.

The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be created in 262 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired.

Incrementing the Module Version Number

As described above, each user-defined class module (data type definition) may have its own version number that tracks changes made to the module over time. In one embodiment, the module version number may be an unsigned int32 that starts at zero and counts up each time the version is incremented, although any other version counting means may also be used. This number is key to loading data saved at different stages of the module's development. By including this version number, techniques described herein may be brought to bear on the problem of loading/storing data that are not available in prior art programming languages.

In some embodiments, reasons for incrementing the version number of a user-defined class may include the following (note that the reasons and various qualifiers shown (such as "mandatory", "optional", and so forth), are for example only, and are not intended to limit the reasons or versioning mechanisms to any particular form or function:

Module's inheritance changed. Mandatory version increment. If the user-defined class changes which other Typedef it inherits from, the version number of the module may be incremented.

Module's private data cluster (.ctl file) changed type. Mandatory. If the user changes the data type of the private data cluster, either by adding controls, deleting controls, replacing controls or changing representation, the version may be incremented.

Module's default value changed. Optional—may display a dialog offering to increment version. The default value for a user-defined class may be the default value of the controls in its private data cluster .ctl file. For example, if the cluster has two numerics with default values 4 and 5, then the default for the type may be two numerics 4 and 5. If the user edits the .ctl file and enters new numbers and selects "Make current value default", a dialog may be displayed to offer to increment the version. When data of a user-defined class type is the same as the type's default data, the entire default data may not be copied into the flattened data, rather, a flag may be added that indicates, "Use type's default data." This requires very little space on disk. When that default value changes, if the version is incremented, the flags may be interpreted as the old default data. If the version is not incremented, the flags may be interpreted as the new default data.

User created a custom function for flattening data. Mandatory. In some embodiments, users may write functions that specify how to flatten their typedefs data. If the typedef does not have such a custom flatten function and the user creates one, a version increment of the module may be triggered.

User edited the existing custom function for flattening data. Optional. If the user changes the existing custom flatten function, they may be presented with a dialog box offering to increment the version. Users may want to increment the version if the changes created a substantial change in the format of the string such that an existing custom unflatten function is no longer correct and needs to be rewritten.

Module loaded under a new version of the environment. Mandatory. When a module is loaded and mutated for a new development environment (e.g., LabVIEW) version, the version number of the module may be incremented. That way when a "Save For Previous functions" (that use this user-defined class) option is invoked (or equivalent), the correct version of data used to write default values of controls may be used.

User decides to increment version for personal reasons. Optional. The user may decide that a version increment is in order even though no data formatting has changed. One possible use would be a new release of the module to users so a given module can be checked to be sure it is the most recent version.

Each of these situations represents an occasion when special handling may be required to put the flat data into a usable form in memory. The module may store the historical database of each version increment and the reason for that increment. This database may be used to automate several of the possible data mutations, unless the user elects to take control away from the development environment (e.g., LabVIEW).

Example Use Case

Consider a developer of a user-defined class, i.e., a user. The user has stored data for the class, i.e., an instantiated object, in a database table, formatted in a column of string type. Upon execution, information is read from the database, unflattened, processed or executed, flattened, and stored back in the database. Now the vender/developer sends the user a new version of the user-defined class which has changed a numeric in the private data from an int32 to a double, but doesn't change the interface (the public member functions or functions). The user copies the new module over the old module and starts execution. No changes are needed to the user's program. The user-defined class can completely change the data type of the private cluster and because the user-defined class knows how to flatten and unflatten old versions of data into the new data format, the user doesn't ever have to know that a version increment occurred. Initially, all the strings in the database are the old version. As they get used and replaced, the database is updated to the new version. But there may never be a need for a "mutate database" step, e.g., a one time churn over all available data to bring it all to the current version. The danger in such steps is that some strings may be missed (which are from then on unloadable or get loaded as corrupt data) or that the number of strings to touch is extremely high and such a step may require significant downtime. This ability to handle changes over time is not a feature of prior art programming languages.

FIG. 7—User Interface Issues

Periodically during editing of user-defined classes, the version of a module may need to be incremented. In some embodiments, in the case of optional version increments users may be presented with a dialog asking them if a specified change requires a version increment. Example dialogs illustrating this feature are shown in FIG. 7.

In one embodiment, dialogs may have only the first line of their text and then a blank line and then the question. All the other information in the dialog may be on a help page, and so these dialogs may include a Help button. Incrementing the version when the default data changes is a common approach, and may be encountered by novice users. For this reason, in some embodiments, an option in Tools>>Options to "Ask to increment version of user-defined class when default data changes" may be provided, as illustrated in the top dialog of FIG. 7. This option may be set to FALSE by default, so that novices who do not understand the space saving format of flat data do not get involved. When a user sets a particular value as the default value of a control and then edit the module's private data .ctl file, the value in their control may remain unchanged.

The bottom dialog of FIG. 7 illustrates a similar option, "Ask to increment version when user-defined class's custom flatten VI changes", which may default to TRUE, but which may be turned off by users to avoid invoking this dialog every time they try to save their VI. It may then be incumbent upon users to manually specify version increments after significant edits.

In some embodiments, users may see an interface impact when editing the custom functions. There may be an editor assistant that keeps certain parts of the diagrams locked and allows edits only limitedly to help ensure that the version mutations are correctly handled.

FIGS. 8A-8E—Example VIs for Further Flatten/Unflatten/Mutation/Save Functionality The automatic mutations described above may be sufficient for most common use cases. However, in some embodiments, additional mutation-related functionality may also be provided, some examples of which are described below.

User-Defined Flatten/Unflatten/Mutation/Save for Previous Functions

In some embodiments, a user may want or need the conversion of the object to be performed in a different manner than implemented by the default mutation function(s), and so means may be provided for allowing the user to specify different mutation functions for the data type. In other words, the user may provide user-defined mutation functions that override the default mutation functions. The following describes example embodiments of one approach for facilitating or implementing such user-defined functionality.

For example, in one embodiment, references to one or more user-defined mutation functions may be included in the second version of the data type definition in response to user input. The one or more user-defined mutation functions may be executable to convert objects conforming to the first version of the data type definition to objects conforming to the second version of the data type definition, and may override the one or more default mutation functions.

Thus, in this embodiment, automatically modifying the object to conform to the second version of the data type definition may include executing the one or more user-defined mutation functions to modify the object to conform to the second version of the data type definition. Note that the references to the one or more user-defined mutation functions may have any of various forms, including, for example, names, ID numbers, relative memory locations (indicated by relative function pointers), and so forth, as desired.

Thus, when users want to specify their own behavior for data, they may write functions (methods or functions). These functions are member functions of the user-defined class that conform to a specific front panel/terminal connectivity (referred to as a connector pane, defined below) and function name, the idea being that they override the "parent" implementation, i.e., the default behavior of Flow Object and all that inherit from it). As used herein, a "connector pane" refers to a set of terminals that corresponds to the controls and indicators of a function, similar to the parameter list of a function call in text-based programming languages. The connector pane defines the inputs and outputs that may be wired to the function so it can be used as a subfunction (e.g., a subprogram or subroutine). A connector pane receives data at its input terminals and passes the data to the block diagram code through the front panel controls or receives the results at its output terminals from the front panel indicators.

Creating custom flatten/unflatten behavior may introduce significant dangers to the development environment. For example, if there is a bug in an unflatten routine, functions cannot load anything other than default data. If there is a bug in the flatten routine, functions may be saved corrupted such that the default data of controls cannot be loaded again. Additionally, once custom functions are introduced, after an event that triggers a version increment, these functions must immediately be rewritten before any other work can proceed. To assist users with this, in one embodiment, the functions for custom flatten and unflatten may have significant wizard oversight guaranteeing, among other things, that the connector pane is correct, that these functions themselves only store default data in controls (so the unflatten function doesn't have to be called in order to unflatten itself), and that the state machine for mutation covers all known versions of the object.

In one embodiment (e.g., of a LabVIEW implementation), the user may write or implement one or more of the following VIs or functions (or equivalents) to affect different parts of the flatten/unflatten mechanism. Note that the VIs (functions) described are meant to be exemplary only, and that the example figures illustrating each VI may not necessarily reflect the correct terminals required for use in a graphical program, i.e., the figures are only intended to illustrate the broad concepts involved.

Custom Flatten to String.vi

Figure 8A:
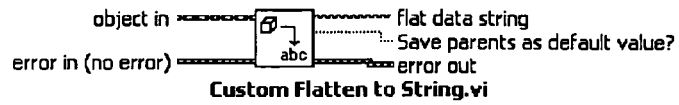
FIGS. 8A-8E illustrate various exemplary VIs for Flatten/Unflatten/Mutation/Save functionality, according to some embodiments.

FIG. 8A illustrates an example "Custom Flatten to String" VI, according to one embodiment. This VI may allow the author to define a string that represents the object's private data. As shown, the VI receives the current object as input, and outputs a string. In preferred embodiments, each level of the hierarchy is flattened in bottom up order (i.e., starting at descendents and working toward ancestors). Each level may output a string and the strings from the various levels concatenated together. During unflatten, the strings may be broken apart and each one passed to the appropriate level of the hierarchy. In the embodiment shown, the Custom Flatten to String.vi has a Boolean output terminal "Save parents as default value?". If this terminal returns TRUE, LabVIEW (for example) may not flatten the data of any ancestral levels of the hierarchy. When unflattening, these levels may be populated with default values, and it may be incumbent upon the child class to use its public API to populate the values correctly. This feature may be useful when implementing a compression algorithm or encryption layer on flattened data, or when the child knows a better way to record information about the parent.

Flatten for Previous Version.vi

Figure 8B:
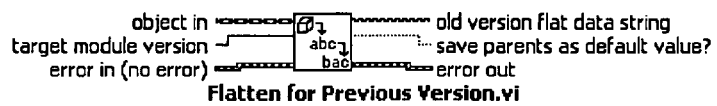

FIG. 8B illustrates an example "Flatten For Previous Version" VI, according to one embodiment. This VI provides custom mutation across versions of LabVIEW. Referencing the sample version table described above, consider a sample user-defined class that changed versions of LabVIEW (from 8.0 to 8.1) between its own version 2 and version 3. If a version 3 object is included on a VI and that VI is "saved for previous" to 8.0, the user may write a custom VI that creates the version 2 flat string. The Flatten for Previous Version.vi is separate and distinct from the Custom Flatten to String.vi since the custom flatten may need to be loaded into memory for all loads/saves, but the Flatten for Previous.vi may only rarely (relatively) be needed. This VI has Object In and "target module version" input terminals. In this embodiment, the target version is a uInt32 that specifies the format of the output string that should be used (in this example, the input would be "2" and so the VI would know to create a string in version 2's format). There are three outputs: the string, a Boolean and an error cluster. If an error is found, the flatten operation is assumed to be impossible, in which case, a Flatten to String primitive may return the error code. A VI attempting to save may simply write down the default default value and may present a dialog warning the user of the error, e.g., indicating which error occurred and indicating to the user that "the control's default value could not be saved and was replaced with default-default value." If there is no error, the string is used. The other Boolean "save parents as default value?" has the same meaning as in the Custom Flatten to String.vi, described above.

Custom Unflatten from String.vi

Figure 8C:
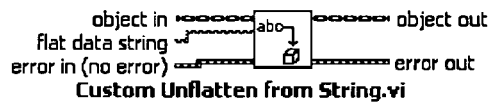

FIG. 8C illustrates an example "Custom Unflatten From String" VI, according to one embodiment. This is the functional companion to the custom flatten VI of FIG. 8A, and operates to translate the flat data back into the object. The Object In is the object with all parent fields already unflattened. Thus it is safe to call all parent-defined member VIs. It is the function of this VI to take the input string and populate the private data for this level of the hierarchy. In one embodiment, the VI may undo whatever operations the Custom Flatten to String.vi may have performed earlier on the object.

Unflatten from Old String.vi

Figure 8D:
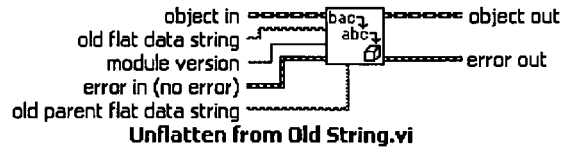

FIG. 8D illustrates an example "Unflatten From Old String" VI, according to one embodiment. This VI defines a mutation across a version increment. It is separate and distinct from Custom Unflatten from String.vi since mutating from old data may become rarer as the old data is all processed and there are fewer occasions to have this (possibly very complex and large) VI in memory. In some embodiments, this VI is where any mutation code for a version increment that LabVIEW (for example) cannot handle automatically may be placed. As FIG. 8D shows, this VI has one of the more complicated connector panes. The Object In (i.e., the input object), as in the Custom Unflatten from String.vi, has all parent data already unflattened. In one embodiment, the old flat data string comes in accompanied by a uInt32 indicating which version of the module wrote this string, which specifies the format of the string.

As may be seen, another string input "old parent flat data string" may also be included. Normally this is an empty string unless one of the object's mutations was one where a level of the hierarchy was removed/replaced. For example: Assume that C inherits from B inherits from A, and an object of type C is flattened. Then, C mutates to inherit directly from A. The old C object is then unflattened. The information in B may be discarded by LabVIEW's automatic unflatten mechanism. The string that describes a B object may be passed in on the "old parent flat data string" terminal. If the old B parent is still accessible to the system, this VI may use that string to construct a B object and query it for information that may be needed to populate the new version.

Create from Parent.vi

Figure 8E:

FIG. 8E illustrates an example "Create From Parent" VI, according to one embodiment. This VI may be called when a level of the hierarchy has been inserted. For example, assume C inherits from A, and B is inserted so that the new version of C inherits from B (which inherits from A). When an old C is unflattened, there is no data to populate B's level of the hierarchy, and so the B module may invoke its Create from Parent.vi. In the embodiment shown, this VI has only "Object In" and an "Object Out" terminals. The Object In has all parent fields (in this example, A) unflattened already and the fields of the current level (B) are set to default. B is free to populate its data as it chooses. This may be important in cases where the default value is inappropriate given the value of parent fields. For example: assume Dog inherits from Animal. Dog has a "breed" field that normally defaults to Chihuahua, however, the VI may note that the "kilograms" field of Animal is 300, and so may change its breed to something more appropriate, for example, Great Dane. Note that in the embodiment shown in FIG. 8E, this VI has no error in or error out functionality, although other embodiments may.

Regarding the "Object In" terminals in the VIs of FIGS. 8A-8E: In preferred embodiments, in all the above VIs, the Object In terminal may be guaranteed not to be a child type on the wire. For example, assume C inherits from B inherits from A, and all three define custom flatten/unflatten VIs. To flatten an object of type C, first, module C may call its flatten, and the object may be passed in. Then the C fields may be stripped off and the object made into type B. Module B may then call its flatten function and the modified object may be passed in. As a consequence, in all of these VIs, there may not be any virtual dispatching to child classes, which may avoid any danger during unflattening of calling a member VI when the fields of that level have not yet been set up.

Thus, embodiments of the techniques described herein may allow user-defined class data to be more resilient to changes in the definition of the data than those of prior art typedefs, where the term "typedef" refers generally to user-defined data type or class definitions. For example, versioning information regarding the version of each individual user-defined class may be stored as part of the class, and may also be maintained in any objects instantiated from the class. Additionally, mutation information may be stored in subsequent versions of the class definition, whereby objects instantiated and stored in accordance with one version of the class or data type definition, may be automatically converted to or reconstituted as objects in accordance with a different, e.g., subsequent, version of the class or data type definition.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A computer-readable memory medium tangibly storing program instructions implementing a program development environment, wherein the program instructions are executable by a processor to perform:
   creating a first version of a class definition in response to user input;
      instantiating and storing a graphical program object of the first version of the class, wherein the graphical program object includes a version identifier (ID) indicating the version of the graphical program object;
      modifying the first version of the class definition in response to user input, thereby creating a second version of the class definition, wherein said modifying the first version of the class definition in response to user input comprises performing a first one or more editing operations on the first version of the class definition, wherein the program instructions are further executable to perform:
      recording the one or more editing operations;
      generating a first one or more default mutation functions based on the one or more editing operations; and
      including first mutation information indicating the first one or more default mutation functions in the second version of the class definition;
   wherein the first one or more default mutation functions are useable to automatically modify the graphical program object to conform to the second version of the class definition without user intervention.

2. The memory medium of claim 1, wherein the program instructions are further executable to perform:
   modifying the second version of the class definition in response to user input, thereby creating a third version of the class definition, wherein said modifying the second version of the class definition in response to user input comprises performing a second one or more editing operations on the second version of the class definition, wherein the program instructions are further executable to perform:
- recording the second one or more editing operations;
- generating second one or more default mutation functions based on the second one or more editing operations; and
- including the first mutation information and second mutation information indicating the second one or more default mutation functions in the third version of the class definition.

3. The memory medium of claim 2, wherein the program instructions are further executable to perform:
- loading a graphical program object of either the first version of the class or the second version of the class from storage; and
- automatically modifying the graphical program object of either the first version of the class or the second version of the class to conform to the third version of the class definition, wherein said automatically modifying is performed without user intervention.

4. The memory medium of claim 1, wherein the first mutation information comprises the first one or more default mutation functions.

5. The memory medium of claim 1, wherein the program instructions are further executable to perform:
- including references to one or more user-defined mutation functions in the second version of the class definition in response to user input, and wherein the one or more user-defined mutation functions are executable to convert graphical program objects conforming to the first version of the class definition to graphical program objects conforming to the second version of the class definition, and wherein the one or more user-defined mutation functions override the one or more default mutation functions;
- loading the graphical program object from storage; and
- executing the one or more user-defined mutation functions to modify the graphical program object to conform to the second version of the class definition.

6. The memory medium of claim 1, wherein said modifying the first version of the class definition in response to user input comprises one or more of:
- adding a data field;
- subtracting a data field;
- reordering two or more data fields; and
- changing inheritance.

7. The memory medium of claim 5,
wherein said storing the graphical program object comprises:
- storing the instantiated graphical program object in non-volatile memory; and
wherein said loading the graphical program object from storage comprises:
- reading the graphical program object from the non-volatile memory.

8. The memory medium of claim 7,
wherein said storing the instantiated graphical program object in non-volatile memory comprises:
- serializing the graphical program object; and
wherein said reading the graphical program object from the non-volatile memory comprises:
- de-serializing the graphical program object.

9. The memory medium of claim 7, wherein the non-volatile memory is comprised in one or more of:
- a host computer system comprising the program development environment; and
- a device coupled to the host computer system over a network.

10. The memory medium of claim 5, wherein said loading the graphical program object from storage comprises:
- including the loaded graphical program object in a graphical program in response to user input.

11. The memory medium of claim 10, wherein the graphical program comprises a plurality of interconnected nodes that visually indicate functionality of the graphical program.

12. The memory medium of claim 10, wherein the graphical program comprises a graphical data flow program.

13. The memory medium of claim 10, wherein the graphical program is operable to perform one or more of:
- an industrial automation function;
- a process control function;
- a test and measurement function.

14. A system for managing data versioning and mutation, comprising:
- a processor; and
- a memory medium coupled to the processor, wherein the memory medium stores program instructions implement a program development environment, wherein the program instructions are executable by the processor to:
  - create a first version of a class definition in response to user input;
  - instantiate and store a graphical program object of the first version of the class, wherein the graphical program object includes a version identifier (ID) indicating the version of the graphical program object;
  - modify the first version of the class definition in response to user input, thereby creating a second version of the class definition, wherein to modify the first version of the class definition in response to user input, the program instructions are executable to perform a first one or more editing operations on the first version of the class definition, wherein the program instructions are further executable to:
    - record the one or more editing operations;
    - generate a first one or more default mutation functions based on the one or more editing operations; and
    - include first mutation information indicating the first one or more default mutation functions in the second version of the class definition;
  - wherein the first one or more default mutation functions are useable to automatically modify the graphical program object to conform to the second version of the class definition without user intervention.

15. A computer-implemented program development environment, comprising:
- means for creating a first version of a class definition in response to user input;
- means for instantiating and storing a graphical program object of the first version of the class, wherein the graphical program object includes a version identifier (ID) indicating the version of the graphical program object;
- means for modifying the first version of the class definition in response to user input, thereby creating a second version of the class definition, wherein said modifying the first version of the class definition in response to user input comprises performing a first one or more editing operations on the first version of the class definition, wherein the means for modifying the first version comprises:

means for recording the one or more editing operations;

means for generating a first one or more default mutation functions based on the one or more editing operations; and means for including first mutation information indicating the first one or more default mutation functions in the second version of the class definition;

wherein the first one or more default mutation functions are useable to automatically modify the graphical program object to conform to the second version of the class definition without user intervention.

16. A computer-readable memory medium tangibly storing program instructions implementing a program development environment, wherein the program instructions are executable by a processor to implement:

creating a first version of a class definition in response to user input;

generating graphical program data created based on the first version of the class definition;

creating a second version of the class definition in response to user input, wherein the second version of the class definition includes a recording schema, wherein the recording schema corresponds to operations that convert the first version of a class definition to the second version of the class definition, and wherein said creating the second version of the class definition comprises:

performing one or more edit operations on the first version of a class definition in response to user input to create the second version of the class definition;

recording the one or more edit operations;

generating one or more default mutation functions based on the one or more edit operations; and including mutation information in the second version of a class definition indicating the one or more default mutation functions;

wherein the first one or more default mutation functions are useable to automatically modify the graphical program data to conform to the second version of the class definition without user intervention.

17. The memory medium of claim 16, wherein the program instructions are further executable by a processor to implement:

including references to one or more user-defined mutation functions in response to user input, and wherein the one or more user-defined mutation functions are executable to convert graphical program data conforming to the first version of the class definition to graphical program data conforming to the second version of the class definition, and wherein the one or more user-defined mutation functions override the one or more default mutation functions.

18. The memory medium of claim 17, wherein the program instructions are further executable to implement:

executing the one or more user-defined mutation functions to automatically modify the graphical program data of the first version of the class definition to conform to the second version of the class definition.

19. The memory medium of claim 16, wherein the program instructions are further executable by a processor to implement:

creating a third version of the class definition in response to user input;

accessing the graphical program data created based on either or second first version of the class definition; and automatically modifying the graphical program data to conform to the third version of the class definition, wherein said automatically modifying is performed without user intervention.

20. A computer-readable memory medium tangibly storing program instructions implementing a program development environment, wherein the program instructions are executable by a processor to implement:

creating a first version of a class definition in response to user input;

generating graphical program data in accordance with the first version of the class definition;

modifying the first version of the class definition in response to user input, thereby creating a second version of the class definition, wherein said modifying the first version of the class definition in response to user input comprises performing a first one or more editing operations on the first version of the class definition, wherein the program instructions are further executable to perform:

recording the one or more editing operations;

generating a first one or more default mutation functions based on the one or more editing operations; and including first mutation information indicating the first one or more default mutation functions in the second version of the class definition;

wherein the first one or more default mutation functions are useable to automatically modify the graphical program data to conform to the second version of the class definition without user intervention.

21. A computer-implemented method for managing data versioning and mutation, the method comprising utilizing a computer to perform:

creating a first version of a class definition in response to user input;

instantiating and storing a graphical program object of the first version of the class, wherein the graphical program object includes a version identifier (ID) indicating the version of the graphical program object;

modifying the first version of the class definition in response to user input, thereby creating a second version of the class definition, wherein said modifying the first version of the class definition in response to user input comprises performing a first one or more editing operations on the first version of the class definition, the method further comprising:

recording the one or more editing operations;

generating a first one or more default mutation functions based on the one or more editing operations; and including first mutation information indicating the first one or more default mutation functions in the second version of the class definition;

wherein the first one or more default mutation functions are useable to automatically modify the graphical program object to conform to the second version of the class definition without user intervention.

22. The memory medium of claim 1, wherein the program instructions are further executable to perform:

loading the graphical program object from storage; and automatically modifying the graphical program object to conform to the second version of the class definition, wherein said automatically modifying is performed without user intervention, and wherein said automatically modifying the graphical program object to conform to the second version of the class definition comprises:

analyzing the included first mutation information to determine the first one or more default mutation functions; and executing the first one or more default mutation functions to modify the graphical program object to conform to the second version of the class definition.

23. The memory medium of claim 22,
wherein said storing the graphical program object comprises:
   storing the instantiated graphical program object in non-volatile memory; and
wherein said loading the graphical program object from storage comprises:
   reading the graphical program object from the non-volatile memory.

24. The memory medium of claim 23,
wherein said storing the instantiated graphical program object in non-volatile memory comprises:
   serializing the graphical program object; and
wherein said reading the graphical program object from the non-volatile memory comprises:
   de-serializing the graphical program object.

25. The memory medium of claim 23, wherein the non-volatile memory is comprised in one or more of:
   a host computer system comprising the program development environment; and
   a device coupled to the host computer system over a network.

26. The memory medium of claim 22, wherein said loading the graphical program object from storage comprises:
   including the loaded object in a graphical program in response to user input.

27. The memory medium of claim 3,
wherein said automatically modifying the graphical program object to conform to the third version of the class definition comprises:
   determining the version of the graphical program object based on the version ID;
   if the graphical program object is of the first version of the class,
      analyzing the included first mutation information and the included second mutation information to determine the first one or more default mutation functions and the second one or more default mutation functions; and
      executing the first one or more default mutation functions and the second one or more default mutation functions to modify the graphical program object to conform to the third version of the class definition; and
   if the graphical program object is of the second version of the class,
      analyzing the included second mutation information to determine the second one or more default mutation functions; and
      executing the second one or more default mutation functions to modify the graphical program object to conform to the third version of the class definition.

28. The memory medium of claim 1, wherein the program instructions are further executable to perform:
   generating a first one or more default reverse mutation functions based on the one or more editing operations; and
   including first reverse mutation information indicating the first one or more default reverse mutation functions in the first or second version of the class definition;
   wherein the first one or more default reverse mutation functions are useable to automatically modify a graphical program object defined in accordance with the second version of the class definition to conform to the first version of the class definition without user intervention.

29. The memory medium of claim 28, wherein the program instructions are further executable to perform:
   loading a graphical program object of the second version of the class from storage; and
   automatically modifying the graphical program object of the second version of the class to conform to the first version of the class definition without user intervention.

30. The memory medium of claim 1, wherein the program instructions are further executable to perform:
   creating at least one successive version of the class definition in response to user input, comprising:
      modifying a previous version of the class definition in response to user input, thereby creating a successive version of the class definition, wherein said modifying the previous version of the class definition in response to user input comprises performing a one or more editing operations on the previous version of the class definition, wherein the program instructions are further executable to perform:
      recording the one or more editing operations on the previous version;
      generating one or more default reverse mutation functions based on the one or more editing operations on the previous version; and
      including reverse mutation information indicating the first one or more default mutation functions in the subsequent or previous version of the class definition;
   wherein the first one or more default reverse mutation functions are useable to automatically modify a graphical program object of the successive version of the class definition to conform to the previous version of the class definition without user intervention.

31. The memory medium of claim 30, wherein the program instructions are further executable to perform:
   loading a graphical program object of the successive version of the class from storage; and
   automatically modifying the graphical program object of the successive version of the class to conform to the previous version of the class definition without user intervention.

32. The memory medium of claim 16, wherein the program instructions are further executable to perform:
   loading the graphical program data from storage; and
   automatically modifying the graphical program data to conform to the second version of the class definition, wherein said automatically modifying is performed without user intervention, and wherein said automatically modifying the graphical program data to conform to the second version of the class definition comprises:
      analyzing the included first mutation information to determine the first one or more default mutation functions; and
      executing the first one or more default mutation functions to modify the graphical program data to conform to the second version of the class definition.

* * * * *